United States Patent [19]

Trager

[11] 4,328,177
[45] May 4, 1982

[54] VAPOR-LIQUID CONTACTING APPARATUS

[75] Inventor: John E. Trager, Arlington Heights, Ill.

[73] Assignee: Procon International Inc., Des Plaines, Ill.

[21] Appl. No.: 182,355

[22] Filed: Aug. 29, 1980

[51] Int. Cl.³ ............................................. B01F 3/04
[52] U.S. Cl. ................................ 261/114 JP; 202/158; 261/114 R
[58] Field of Search ............................... 261/108–113, 261/114 R, 114 JP; 202/158; 62/34, 42

[56] References Cited

U.S. PATENT DOCUMENTS

| | | | |
|---|---|---|---|
| 2,046,456 | 7/1936 | Johnson | 29/163.5 |
| 2,682,394 | 6/1954 | Guthrie et al. | 261/113 |
| 2,711,307 | 6/1955 | Milmore | 261/108 |
| 2,711,308 | 6/1955 | Cogan | 261/113 |
| 2,747,849 | 5/1956 | Colburn et al. | 261/114 R |
| 2,750,174 | 6/1956 | Cogan | 261/113 |
| 2,819,888 | 1/1958 | Moyer | 261/114 JP |
| 2,860,860 | 11/1958 | Wilson | 261/113 |
| 2,875,993 | 3/1959 | Marcy | 261/113 |
| 2,882,030 | 4/1959 | Zuiderweg | 261/110 |
| 3,481,474 | 12/1969 | Paulson | 210/304 |
| 3,483,974 | 12/1969 | Pearsall | 209/273 |
| 3,489,506 | 1/1970 | Galstaun et al. | 261/113 X |
| 3,584,685 | 6/1971 | Boyd | 166/231 |
| 3,592,452 | 7/1971 | Katyal | 261/109 |
| 3,667,615 | 6/1972 | Likness | 210/497.1 |
| 4,157,905 | 6/1979 | Hengsterbeck | 62/34 |
| 4,170,626 | 10/1979 | Cutter et al. | 422/143 |

Primary Examiner—Richard L. Chiesa
Attorney, Agent, or Firm—James R. Hoatson, Jr.; John F. Spears, Jr.; William H. Page, II

[57] ABSTRACT

A vapor-liquid contacting apparatus suitable for use as a fractionation tray is disclosed. The horizontal liquid support area of the apparatus has a flat vapor-liquid contacting area formed by closely spaced parallel members. The parallel members are shaped such that the elongated openings between adjacent members have a tapered shape which is smallest at the top. The apparatus may be used as a fractionation tray which has a low pressure drop and a low tendency for liquid to fall through the contacting area.

12 Claims, 5 Drawing Figures

VAPOR-LIQUID CONTACTING APPARATUS

FIELD OF THE INVENTION

The invention relates to the design of a vapor liquid or liquid-liquid contacting apparatus. The invention more specifically relates to a fractionation tray for use within a fractionation column. Similar types of apparatus may be found in U.S. patents classified in Classes 261, 202 and 239.

PRIOR ART

Fractionation trays have been in widespread commercial use for a great time, and there exists a large volume of accumulated knowledge as to the design and construction of fractionation trays. For instance, Section 18 of the 4th Edition of the *Chemical Engineers' Handbook*, McGraw-Hill Book Co., 1963, describes several different types of fractionation trays and presents a large amount of information useful in the design and operation of fractionation trays.

One type of fractionation tray which is well described in the literature is referred to as a grid tray. The vapor-liquid contacting area of this tray is often a single flat surface formed by a large number of spaced apart parallel horizontal strips or bars. The horizontal strips are separated by a small distance to allow the vertical passage of fluid through the long narrow opening between adjacent strips. This type of fractionation tray is described in U.S. Pat. Nos. 2,682,394, (Cl. 261-113); 2,711,308 (Cl. 261-113); 2,750,174 (Cl. 261-113); 2,711,307 (Cl. 261-108); 2,860,860 (Cl. 261-113); 2,875,993 (Cl. 261-113); and 2,882,030 (Cl. 261-110). It is believed that these references are directed to grid trays in which both the rising vapor and descending liquid pass through the same elongated slots between adjacent horizontal members. That is, these references exemplify the use of a grid tray in a fractionation column which does not have downcomers to carry the liquid to the next lower tray. The horizontal members forming the vapor-liquid contacting areas in the first three of these references may have sloping or curved sides which result in the members being widest at their upper surface.

U.S. Pat. No. 4,157,905 (Cl. 62-34) is believed pertinent for its teaching that grid trays are recommended for use without a downcomer but could be used with downcomers.

U.S. Pat. No. 2,747,849 (Cl. 261-114) illustrates a fractionation tray used with downcomers in which the vapor-liquid contacting area has a substantially flat surface having a large number of elongated narrow openings through which the rising vapor passes.

U.S. Pat. No. 3,592,452 (Cl. 261-109) presents a fluid contacting device which may be used as a fractionation tray. This device has an upper surface formed by a large number of spaced apart parallel and horizontal members which extend across the column. A second set of horizontal closely spaced members having a different alignment supports the first set of parallel members. Either the upper or lower set of parallel members may be rotated about a vertical axis to vary the available open area of the tray.

BRIEF SUMMARY OF THE INVENTION

The invention provides a vapor-liquid contacting apparatus suitable for use as a fractionation tray which has desirable pressure drop and flooding characteristics.

One broad embodiment of the invention may be characterized as a vapor-liquid contacting apparatus which comprises a vapor containment vessel having a sidewall with a vertical inner surface; a horizontal liquid support plate having an outer edge of which abuts at least a portion of the inner surface of the sidewall in the containment vessel, the liquid support plate having a horizontal vapor-liquid contacting area comprising a plurality of horizontal parallel members spaced apart by a distance between 0.010 cm. and about 0.080 cm., with the vapor-liquid contacting area of the support plate having an open area between 5 and 16.5 percent and with adjacent parallel members of the vapor-liquid contacting area having opposing side surfaces which if extended upward would intersect at an angle between 5° and 120° at a point above the upper surface of the vapor-liquid contacting area; and means to supply liquid to the upper surface of the liquid support plate at a first point and to remove liquid from the upper surface of the liquid support plate at a second point, with the liquid flow path between the first and the second points being perpendicular to the parallel members of the vapor-liquid contacting area.

In a second broad embodiment the parallel members have curved sides and are shaped such that the smallest distance between any two adjacent members is located at the upper surface of the members and is less than one-half the horizontal distance separating the bottom of the adjacent parallel members.

DETAILED DESCRIPTION

Figure 1:
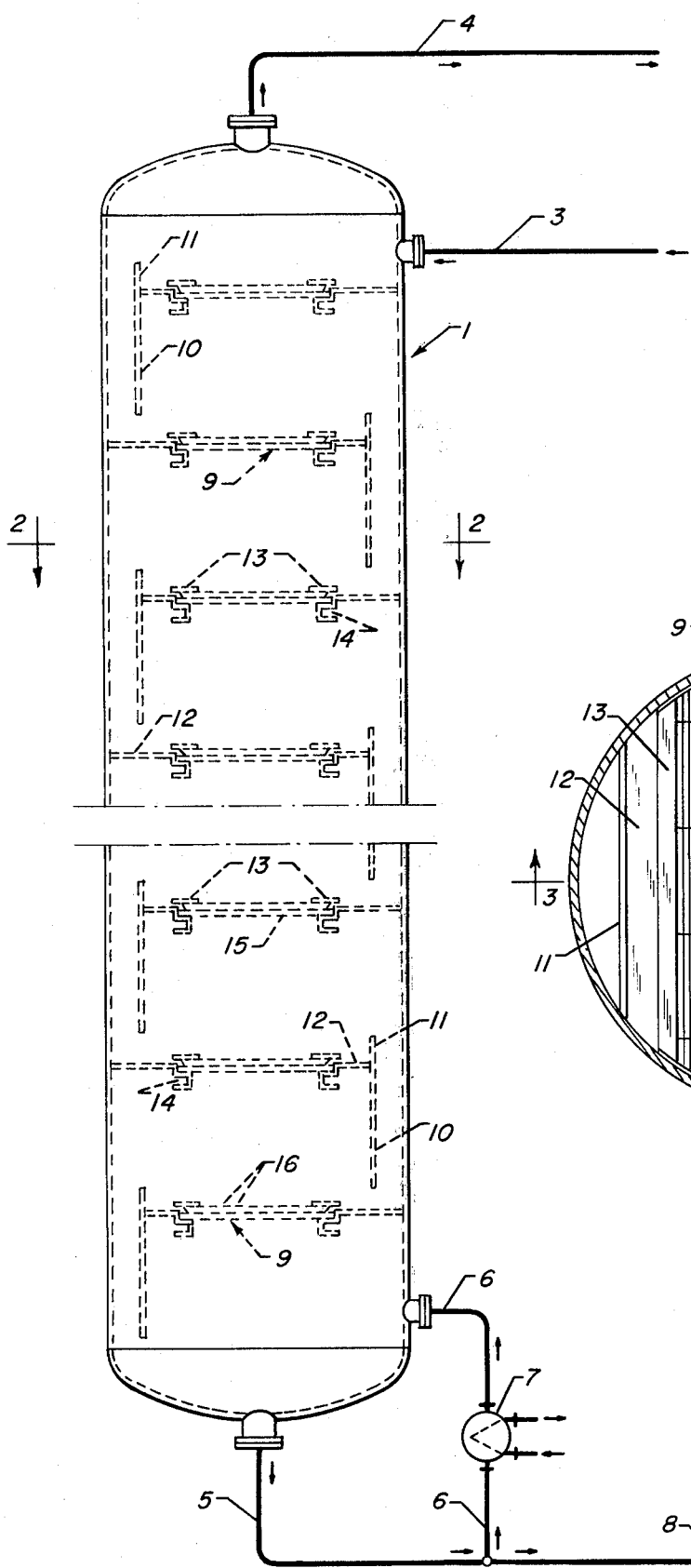
FIG. 1 is a simplified Drawing of a vertical fractionation column which contains several of the subject fractionation trays 9.

Vapor-liquid contacting apparatus are in widespread use in the chemical, petrochemical and petroleum industries. For instance, vapor-liquid contacting apparatus is used in processes for the removal of certain compounds from vapor streams, such as the scrubbing of sulfur dioxide from a flue gas stream. One of the most common applications of vapor-liquid contacting apparatus is as fractionation trays in the separation of chemical compounds. These separations include the production of high purity oxygen or nitrogen by the cryogenic fractionation of liquefied air, the separation of mixtures of water and any various alcohols, the fractionation of light hydrocarbons and the fractionation of crude oil.

In designing fractionation trays, and also other vapor-liquid contacting apparatus, a number of important and sometimes conflicting design characteristics must be considered. These factors include but are not limited to the structural strength of the apparatus and its ability to support both its own weight and the weight of the liquid which rests upon it, the size, shape and number of the openings provided in the vapor-liquid contacting area of the tray, the efficiency of the tray, the tendency of the tray to "weep," the tendency of the tray to flood, and the pressure drop experienced by the vapor rising through the tray. An ideal fractionation tray must also be resistant to plugging or breakage, and be easy to assemble from a number of smaller parts which are passed into an outer vessel through the relatively small opening of a manway.

It is an objective of the subject invention to provide a vapor-liquid contacting apparatus having many of the desirable characteristics of a fractionation tray. It is another objective of the subject invention to provide a fractionation tray which produces a relatively low pressure drop at a given upward vapor velocity. It is a further objective of the subject invention to provide a fractionation tray having a low tendency to weep, that is to allow liquid to pass downward through the openings in the vapor-liquid contacting area. A further objective of the subject invention is to provide a fractionation tray having great rigidity and structural strength without the use of a large number of support elements attached to the wall of the vessel and which may be fabricated with a self-supporting vapor-liquid contacting area. Yet another objective of the subject invention is to provide a low pressure drop liquid support tray for use in treating vapor streams.

The subject invention provides many of the desired characteristics of a fractionation tray through a unique arrangement of several structural elements. At the heart of the subject vapor-liquid contacting apparatus is a vapor-liquid contacting area formed by a large number of closely spaced apart parallel and horizontal members. These parallel members are preferably of equal size and have a width which is at least five times as great as the distance between adjacent members. The upper surface of these members forms the substantially flat upper surface of the vapor-liquid contacting area of the entire apparatus. These upper parallel members are attached, by welding, to a second plurality of horizontal supporting bars or members which are perpendicular to the upper plurality of members. The lower members may have a depth which is several times that of the upper members to provide an integrated structure having great rigidity and capable of independently withstanding the weight loadings experienced within a fractionation column. There are fewer of the lower parallel members and they are much more widely spaced apart than the upper parallel members. As used herein, the term "vapor-liquid contacting area" of a fractionation tray is intended to refer to that portion of the surface area of the tray through which it is desired for vapor to pass upward and which contains at least 95% of the total open area of the fractionation tray.

Referring now to FIG. 1, there is shown a simplified illustration of a fractionation column 1 utilizing several fractionation trays 9 constructed in accordance with the subject invention. A feed stream is passed into an intermediate point of this column at a point not shown. The liquid which accumulates at the bottom of the column is withdrawn through line 5 and divided into a first portion removed through line 8 as a bottoms product and a second portion which is passed through line 6 and an external reboiler 7 to generate vapor which is passed into a lower portion of the fractionation column through line 6. An overhead vapor stream is removed from the column in line 4 and condensed by means not shown to form overhead liquid which is divided into an overhead product stream withdrawn from the system and a liquid reflux stream which is returned to the column through line 3. Alternatively, the feed stream may be passed into the column through line 3. Liquid from line 3 flows horizontally across the uppermost fractionation tray. It then passes over the top of the weir 11 and enters a downcomer through which it descends to the next lowest fractionation tray. The liquid phase present within the fractionation column thereby travels downward in a sigmoid path traveling from tray to tray through the appropriate downcomer. The vapors present within the fractionation column rise through the vapor-liquid contacting area of the fractionation trays and thereby flow in a generally countercurrent direction to the descending liquid.

Figure 2:
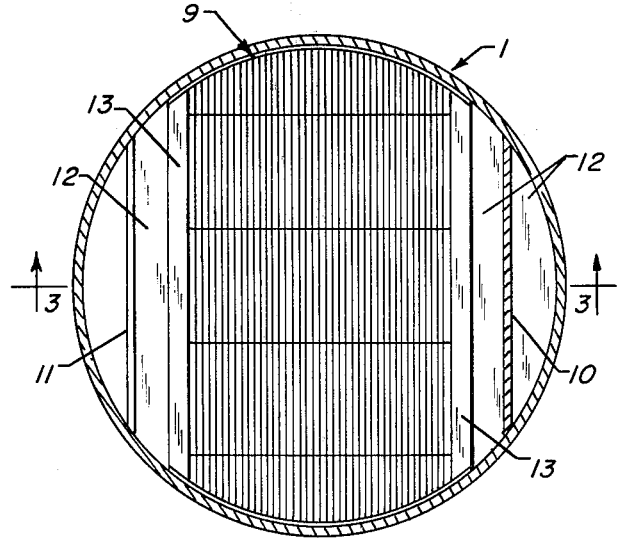
FIG. 2 is a cross-section of the fractionation column shown in FIG. 1 taken along a horizontal plane at the point indicated in FIG. 1 and looking downward toward the upper surface of one of the fractionation trays in the column.

FIG. 2 is the view seen looking downward at an intermediate elevation in the fractionation column toward the upper surface of a fractionation tray 9. In this view, it may be seen that the fractionation tray has a circular outer edge which abuts a large portion of the inner surface of the vertical containment vessel of the column. This provides a seal capable of blocking fluid flow at the edge of the tray. This seal extends around the entire tray including the imperforate area under the inlet downcomer. The only point at which the tray is not adjacent the inner surface of the column is along the outlet weir 11. The chordal wall of the outlet downcomer of this fractionation tray is under the outlet weir shown on the left-hand side of the FIGURE. The vapor-liquid contacting area of the tray is formed by five panels each comprising a large plurality of parallel members which run across the upper surface of the tray parallel to the chordal downcomer walls and perpendicular to a line drawn between the central vertical axes of the inlet and outlet downcomers. The individual panels rest upon the imperforate supports 12, with the seam between the ends of the panels and the supports being covered by the long narrow cover plates 13.

Figure 3:
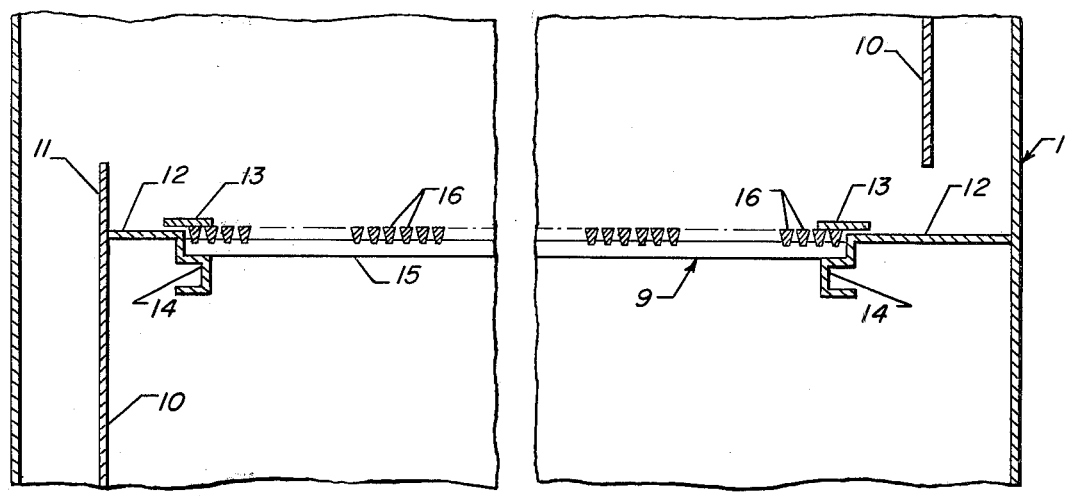
FIG. 3 is a cross-sectional diagram of the fractionation tray shown in FIG. 2 taken along a vertical plane at the point indicated in FIG. 2.

FIG. 3 is an enlarged cross-sectional view of the fractionation tray 9 shown in FIG. 2. An inlet downcomer wall 10 is present at the right-hand side of this FIGURE. One horizontal imperforate support 12 attached to the inner surface of the vertical wall of the column 1 is located immediately below the inlet downcomer. This support has a channeled lip 14 for added structural strength. On the left-hand side of the FIGURE, there is shown a second imperforate support 12 having a similar lip which is attached to the outlet downcomer. The wall 10 of the outlet downcomer extends upward to an upper edge which acts as the outlet weir 11 of the fractionation tray and retains a minimum liquid level upon the upper surface of the tray. The vapor-liquid contacting area of the tray is formed by the perforate panels which rest upon and extend between the supports 12. With a proper upward vapor flow the panels and the supports act as a unitary liquid support plate which retains the liquid flowing across the tray. Vapor rises through the elongated openings between the upper parallel wires or members 16 which are supported by the lower members 15. The ends of the lower members rest on the supports, with the seam between the panels and the supports being covered by a plate 13 which is bolted to the supports to hold the panels in position.

Figure 4:
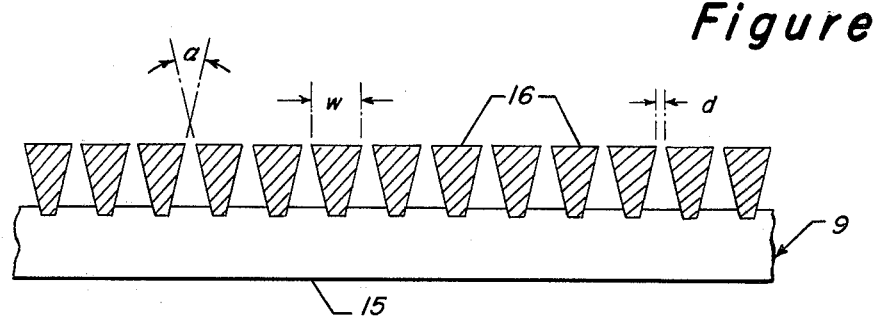
FIG. 4 is a cross-sectional diagram of a small portion of the vapor-liquid contacting area of the fractionation tray shown in FIG. 3.

FIG. 4 presents details of the preferred structure of the panels forming the vapor-liquid contacting area of the tray shown in the preceding FIGURE. The upper parallel members 16 are perpendicular to the lower support members or bars 15. The lower members may be round, wedge-shaped or rectangular in cross-section. The upper members have a wedge-shaped cross-section such that the opposing vertical surfaces of adjacent members would intersect at an angle alpha if extended above the surface of the tray. This angle is preferably between 10° and 90°. The small distance "d" and the much larger distance "w," which is referred to herein as the width of the upper member, are also indicated on this FIGURE.

Figure 5:
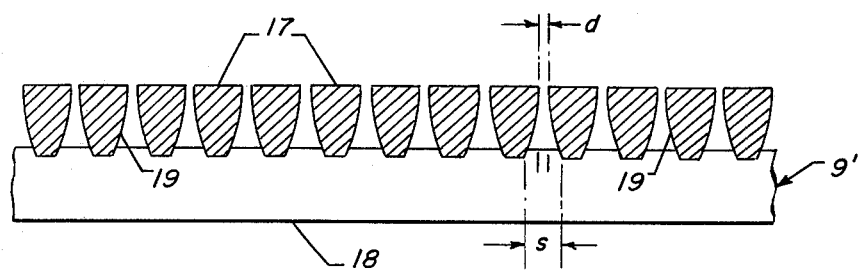
FIG. 5 is a cross-sectional diagram of a small portion of a vapor-liquid contacting area in which the parallel members 17 have curved sides.

FIG. 5 shows an alternative construction of the vapor-liquid contacting area of the subject apparatus. In this embodiment, the vertical sides 19 of the upper members 17 are curved rather than flat. The other aspects of this construction are the same as in FIG. 4. The distance between two adjacent upper members "d" is smallest at the flat upper surface of the members. The space "s" at the bottom of these members is at least twice as large as the distance "d" and may be 3 to 8 times greater in length. The elongated opening therefore tapers to its smallest width at the upper surface of the vapor-liquid contacting area. The upper members are attached to horizontal support members 18, which are perpendicular to the upper horizontal members.

The vapor-liquid contacting area of the subject apparatus is preferably formed by a grid of perpendicular metal wires which are welded together to form a high strength screen. This grid is flat and is mounted in a substantially horizontal position as part of the apparatus. The grid has an upper surface formed by the upper layer of wires or members, which are all located at the same elevation. The wires of the upper layer are parallel to each other and separated by only a small distance. Preferably the upper surface of each of the upper members is flat and horizontal such that the upper surface of the grid is flat and uninterrupted except for the openings between adjacent bars. The parallel members of the upper layer are perpendicular to the parallel members of the lower layer, which are in the same plane as the upper layer but much more widely spaced apart. The upper and lower layers are attached at each point the individual members intersect, with the lower members functioning as the support bars and connecting means for the upper members. It is believed the lower members do not affect the vapor-liquid contacting action of the apparatus. The lower support members will normally be larger in cross-sectional size and fewer in number than the upper members. Normally, there will be at least three times as many upper members as lower members. It is greatly preferred that the perpendicular members are welded to each other but they may be attached in other ways, especially if nonmetallic members are used in the apparatus.

Welded grids of perpendicular bars are in widespread commercial use. Some of the typical applications of these structures are water well intake screens, catalyst retention screens in catalytic reactors and fluid collection or distribution assemblies. This grid is often welded together in the form of a cylindrical gridwork by wrapping a continuous wire over longitudinal bars. This gridwork is then cut lengthwise and flattened to form the finished grid. For instance, in U.S. Pat. No. 2,046,456, there is shown the use of a cylindrical porous wall of this type of construction as a well point and well screen. A centrifugal fluid strainer using a cylindrical grid is shown in U.S. Pat. No. 3,481,474. A screening unit for use in the mining industries which includes a flat porous grid of the preferred construction is shown in U.S. Pat. No. 3,483,974. This porous grid may have a structure and configuration very similar to that employed in the vapor-contacting area of the subject apparatus. U.S. Pat. No. 3,584,685 presents a strainer using a welded cylindrical filter element. U.S. Pat. No. 3,667,615 illustrates many of the different welded grids which may be formed using bars of different cross-sectional shape. U.S. Pat. No. 4,170,626 presents a gas distribution device for use in fluidized beds of solid particles comprising a cylindrical porous wall formed of a grid having the preferred construction.

The upper members preferably have flat vertical sides similar to those shown in FIG. 4 but may have different shapes. In this embodiment, the opposing surfaces of adjacent bars are inclined from true vertical such that the elongated opening between the adjacent bars forms a "V" slot having its broadest opening at the bottom. An alternative method of describing this configuration is that the opposing surfaces of adjacent members would intersect at an angle between 5 and 120 degrees if extended above the upper surface of the grid. Preferably, this angle is between 10 and 90 degrees.

The above cited references, which describe various uses of welded wire grids, also describe grids of various types including those having a "V" slot opening. This opening configuration is often credited with being beneficial to the operation of the different apparatus, such as well screens, as it tends to be selfcleaning. The "V" slot is characterized as self-cleaning since any particles or movable deposits which pass into the smallest part of the slot will be removed from the screen by the flowing fluid. This is because in the applications described in these references the screens are oriented such that the fluid flows inward through the smallest opening of the V-slot and then through the screen.

In the subject apparatus the fluid flow is upward through the contacting area. The direction of the fluid flow through the subject apparatus is therefore believed to be opposite that used in the previously described filtration or collection devices which have screens with self-cleaning V slots. In the subject apparatus the fluid flows upward into the largest part of the slot and then towards the smallest part of the slot where it exits. This flow path is thought to be at least partially responsible for the low pressure drop and low weepage which is observed with the subject apparatus. The rising vapors are channeled into the smallest part of the openings. This increases velocity effects which tend to support the liquid on the upper surface of the contacting area rather than allowing the liquid to flow downward.

It is believed that the shape of the opening also produces the low pressure drop which has been observed across the apparatus (the pressure differential between points below and above the contacting area) in dry tests and in simulations because the opening has the form of a small venturi, which itself has a low pressure drop. The liquid which rests upon the upper surface of the individual parallel members forming the top of the contacting area may also aid in reducing the pressure drop through the contacting area by forming the curved outlet of the venturi. That is, the liquid resting on the top surfaces of two adjacent parallel members may form into mounds having a rounded upper surface such that these two mounds, at least momentarily, resemble the smooth outlet throat of the venturi.

The desired tapered fluid passageway or opening between adjacent members may be a shape different than the preferred "V" slot. The shape of this elongated opening is determined by the shape of the upper members. The upper members can have a wide variety of shapes other than that shown in FIG. 4. For instance, in FIG. 5 these same members have curved opposing vertical sides. Another alternative is for the opposing sides to have different shapes or inclinations. As one example of this, the upper members could have a cross-section in the shape of a right triangle and be fastened in place so that they have a horizontal upper surface, a truly vertical side and a single inclined side. The vertical sides of the members are preferably inclined from true vertical. Unless otherwise specified, any reference herein to the sides or vertical sides of the members is intended to refer to the flat or curved inclined surfaces which extend downward from the upper surface of the members. Any reference herein to opposing sides is intended to refer to the adjacent sides of two different adjacent members.

The elongated parallel members which form the upper surface of the vapor-liquid contacting area are spaced apart by relatively small distances compared to the opening present in most commonly used fractionation trays. The distance between adjoining members, which is labeled "d" in FIG. 4 is between 0.010 cm. and 0.080 cm. Preferably, this distance is between 0.022 cm. and 0.051 cm. Unless otherwise specified, any reference to the spacing or distance between the parallel members is intended to indicate the minimum distance between adjacent members, which is preferably at the top of the members. The width of the uppermost portion of these members, labeled as "w" in FIG. 4 is preferably between about 0.15 cm. and 0.55 cm. These upper members are preferably made of stainless steel or other noncorroding material since any corrosion would tend to reduce the already small space between the adjacent upper members.

It is believed that because this space is small the surface tension of the liquid tends to suspend the liquid above the opening thereby resulting in the low tendency of the apparatus to "weep" in fractionation tray simulations. One of the most important factors in determining the distance "d" and the width "w" of the upper members is the total open area which is to be provided in the vapor-liquid contacting area. This open area should be between 5.0 and 16.5 percent of the total surface area of the vapor-liquid contacting area. Preferably, the open area of the subject apparatus is between 7.5 and 13.5 percent when used as a fractionation tray. As used herein, the term "open area" is intended to refer to the percent of the total area of the tray, exclusive of downcomer areas, which is intentionally left open by the provisions of perforations or openings for the upward passage of the vapor or liquid. The number and dimensions of the lower perpendicular members is set by the expected total weight loading on the vapor-liquid contacting area and the size of individual sections of the contacting area which are self-supporting.

The vapor-liquid contacting area of the apparatus is preferably assembled from rectangular panels having a maximum size of about 3 meters by about 0.45 meters. These panels may be passed into the containment vessel through an available opening such as a manway and then laid in place on supports attached to the inner surface of the vessel and extending across its cross-section. The panels are then bolted or clamped down to prevent movement. The number and size of the panels will be set by the required diameter of the containment vessel.

One embodiment of the invention may be characterized as a vapor-liquid contacting apparatus useful as a fractionation column which comprises a vapor containment vessel having a vertical sidewall and a cylindrical inner surface; a first downcomer means and a lower second downcomer means located adjacent the inner surface of the containment vessel and opposite each other; and a fractionation tray extending horizontally between the first and the second downcomer means and comprising a substantially flat and horizontal vapor-liquid contacting area having an upper surface and comprising a plurality of horizontal parallel members spaced apart by a distance between about 0.010 cm. and about 0.080 cm. and attached to a smaller second plurality of horizontal bars which are located below the parallel members, with the horizontal bars being substantially perpendicular to the parallel members and with the parallel members being substantially perpendicular to a line between the first and the second downcomer means, and with adjacent parallel members of the vapor-liquid contacting area having opposing surfaces which if extended upward, would intersect at an angle between 5 and 120 degrees at a point above the upper surface of the vapor-liquid contacting area.

A typical fractionation tray comprises an imperforate horizontal area located under the inlet downcomer. This is a liquid receiving area and is part of the "dead area" of the tray through which it is intended for no liquid or vapor to pass. This liquid receiving area may be separated from the vapor-liquid contacting area by a vertical inlet weir, but the use of such a weir is not preferred. Inlet weirs are normally only used when liquid rates are expected to be low enough to allow vapor to rise through the column if the weir is not present. Additional amounts of dead area are normally located at the periphery of the tray especially at points where it rests on a support ring or lip fastened to the inner surface of the tray. An outlet weir, which is normally formed by an upward extension of the outlet downcomer wall, is commonly present on the upper surface of the tray. The height of the outlet weir is set by the static liquid level which is to be present on the tray. The inlet and outlet downcomers are often vertical chordal walls as this is simple structure to fabricate and also serves to both collect and discharge the descending liquid in a manner which promotes uniform liquid flow across the tray. It is preferred that no flow directing vanes are placed on the tray, although these and other flow distribution means such as specially designed inlet and outlet weirs could be used on the subject apparatus if it is quite large in diameter. The tray or other contacting apparatus is preferably horizontal, although the tray may be slightly tilted toward the liquid outlet to reduce the gradient required for the desired liquid flow rate across the surface of the tray. As used herein, the term "substantially horizontal" is intended to indicate an inclination from true horizontal of less than 5 degrees.

The horizontal portion of the total apparatus is located within a containment vessel. This vessel will have a vertical inner surface if it is part of a fractionation column, but the inner surface could be sloped if the apparatus is used for other purposes. As used herein, the term "substantially vertical" is intended to indicate an inclination from true vertical of less than 5 degrees. The containment vessel will normally be entirely enclosed except for the necessary transfer conduits for entering and exiting fluid streams, control system sensors, etc. Fractionation columns are normally fabricated from metals such as carbon or stainless steel. Highly corrosive compounds may dictate the use of more exotic metals. The containment vessels of other types of contacting apparatus, such as flue gas scrubbing towers, may be made from other materials including concrete or fiber reinforced polyester or other plastics.

The inventive concept includes a process for the separation of two or more different chemical compounds by fractional distillation through the use of the subject apparatus. The fractionation column used in this process would be operated in accordance with normal operating procedures. The conditions used during the operation of fractionation processes are normally set by such factors as the temperature and pressure required to produce both vaporous and liquid phases containing the two chemical compounds which are being separated. Other limitations are set by the tendency of certain compounds, typically aromatic or olefinic hydrocarbons, to thermally degrade into undesired compounds when exposed to high temperatures in a reboiler. A broad range of operating conditions for a fractionation column include a pressure between about 0.1 atmosphere absolute and about 35 atmospheres and a bottoms temperature between 0° C. and about 350° C. Cryogenic separations of various normally gaseous materials, such as oxygen, nitrogen and carbon dioxide, can be conducted at much lower temperatures including temperatures of about minus 150° C. or below. A reflux ratio between about 1.0:1.0 and about 5.0:1.0 may be employed, and the column will normally contain from 10 to about 90 or more trays.

The subject apparatus is not limited to use as a fractionation tray. It may be used in a wide variety of vapor-liquid contacting processes including pollution control and solvent recovery processes. One example of this is the scrubbing of power plant flue gases to reduce sulfur oxide emissions, a situation in which a very low pressure drop through the contacting apparatus is desired. The apparatus may also be utilized in absorption columns, such as those used to remove hydrogen sulfide or heavy hydrocarbons from streams of vaporous light hydrocarbons. It is contemplated that the subject apparatus could also be utilized to perform separations using liquid-liquid extraction with a minimal amount of structural change.

I claim as my invention:

1. A vapor-liquid contacting apparatus which comprises:
   (a) a vapor containment vessel having a sidewall with a substantially vertical inner surface;
   (b) a substantially horizontal liquid support plate having an upper surface and an outer edge which is adjacent to at least a portion of the inner surface of the sidewall of the vapor containment vessel, the liquid support plate having a substantially horizontal vapor-liquid contacting area comprising a plurality of horizontal parallel members having a flat upper surface possessing a width of between about 0.15 cm and 0.55 cm and being uniformly spaced apart by a distance between 0.022 cm. and about 0.051 cm. to substantially eliminate weeping through said liquid-support plate, with the vapor-liquid contacting area of the support plate having an open area between about 5.0 and about 16.5 percent and also having a flat upper surface, and with the parallel members being shaped such that the smallest distance between any two adjacent parallel members is located at the upper surface of the adjacent parallel members and the distance between the vertical sides of adjacent parallel members is at least twice as large at the bottom of the adjacent parallel members as at the top of adjacent parallel members; and
   (c) downcomer means to supply liquid to the upper surface of the liquid support plate at a first point and to remove liquid from the upper surface of the liquid support plate at a second point, with the liquid flow path between the first and the second points being perpendicular to the parallel members of the vapor-liquid contacting area.

2. The apparatus of claim 1 further characterized in that the vapor-liquid contacting area has an open area between 7.5 and 13.5 percent.

3. The apparatus of claim 2 further characterized in that the parallel members of the vapor-liquid contacting area have flat vertically sloping sides.

4. The apparatus of claim 2 further characterized in that the parallel members of the vapor-liquid contacting area have curved vertically sloping sides.

5. A vapor-liquid contacting apparatus which comprises:
   (a) a vapor containment vessel having a sidewall with a substantially vertical inner surface;
   (b) a substantially horizontal liquid support plate having an upper surface and an outer edge which is adjacent to at least a portion of the inner surface of the sidewall of the containment vessel, the liquid support plate having a substantially horizontal vapor-liquid contacting area comprising a plurality of horizontal parallel members having a flat upper surface possessing a width of between about 0.15 cm and 0.55 cm and being uniformly spaced apart by a distance between 0.022 cm and about 0.051 cm. to substantially eliminate weeping through said liquid support plate, with the vapor-liquid contacting area of the support plate having an open area between about 5.0 and about 16.5 percent and also having a flat upper surface, and with adjacent parallel members of the vapor-liquid contacting area having opposing sides which if extended upward would intersect at an angle between 5 and 120 degrees at a point above the upper surface of the vapor-liquid contacting area; and
   (c) downcomer means to supply liquid to the upper surface of the liquid support plate at a first point and to remove liquid from the upper surface of the liquid support plate at a second point, with the liquid flow path between the first and second points being perpendicular to the parallel members of the vapor-liquid contacting area.

6. The apparatus of claim 5 further characterized in that the opposing sides of adjacent parallel members would intersect at an angle between 10 and 90 degrees if extended upward.

7. The apparatus of claim 5 further characterized in that the vapor-liquid contacting area has an open area between about 7.5 and 13.5 percent.

8. The apparatus of claim 7 further characterized in that each of the parallel members of the vapor-liquid contacting area has said flat upper surface at the same elevation as the upper surface of the vapor-liquid contacting area, and in that the liquid support plate has a single vapor-liquid contacting area.

9. A vapor-liquid contacting apparatus useful as a fractionation column which comprises:
   (a) a vapor containment vessel having a vertical sidewall and a cylindrical inner surface;
   (b) a first downcomer means and a lower second downcomer means located adjacent the inner surface of the containment vessel and opposite each other to transfer liquid downward through said containment vessel; and,
   (c) a fractionation tray extending horizontally between the first and the second downcomer means and comprising a substantially flat and horizontal vapor-liquid contacting area having an upper surface and comprising a first plurality of horizontal parallel members having a flat upper surface possessing a width of between about 0.15 cm and 0.55 cm and being uniformly spaced apart by a distance between about 0.022 cm. and about 0.051 cm. to substantially eliminate weeping through said fractionation tray and attached to a smaller second plurality of horizontal bars which are located below the parallel members, with the horizontal bars being substantially perpendicular to the parallel members and with the parallel members being substantially perpendicular to a line between the first and the second downcomer means, and with adjacent parallel members of the vapor-liquid contacting area having opposing surfaces which if extended upward would intersect at an angle between 5 and 120 degrees at a point above the upper surface of the vapor-liquid contacting area.

10. The apparatus of claim 9 further characterized in that the opposing surfaces of adjacent parallel members would intersect at an angle between 10 and 90 degrees.

11. The apparatus of claim 10 further characterized in that the fractionation tray comprises a single unsegmented vapor-liquid contacting area having a flat upper surface formed by the upper surfaces of the parallel members.

12. The apparatus of claim 11 further characterized in that the open area of the vapor-liquid contacting area is between about 7.5 and 13.5 percent.

* * * * *